(12) United States Patent
Deshpande

(10) Patent No.: US 6,434,638 B1
(45) Date of Patent: Aug. 13, 2002

(54) ARBITRATION PROTOCOL FOR PEER-TO-PEER COMMUNICATION IN SYNCHRONOUS SYSTEMS

(75) Inventor: Sanjay Raghunath Deshpande, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/352,660

(22) Filed: Dec. 9, 1994

(51) Int. Cl.[7] .......................... G06F 13/14; G06F 13/28; G06F 13/42; G06F 13/364

(52) U.S. Cl. .............................. 710/39; 710/35; 710/21; 710/45; 710/61; 710/112; 710/117; 710/118; 711/168; 711/146; 711/150

(58) Field of Search ................................ 395/800, 200, 395/275, 550; 364/DIG. 1; 712/22, 213, 203, 16, 23, 24; 711/146, 145, 119, 115, 124, 168, 169; 710/105, 40, 112, 116, 121, 117, 118, 134, 243, 35, 129, 31, 29, 261, 39, 45, 262, 61, 601

(56) References Cited

U.S. PATENT DOCUMENTS

| | | | |
|---|---|---|---|
| 4,556,310 A | * 12/1985 | Masuda et al. | 355/11 |
| 4,704,606 A | 11/1987 | Hasley | |
| 4,811,277 A | * 3/1989 | May et al. | 370/94 |
| 4,959,775 A | 9/1990 | Yonekura | |
| 4,961,140 A | 10/1990 | Pechanek et al. | |
| 4,987,529 A | * 1/1991 | Craft et al. | 364/200 |
| 5,179,709 A | 1/1993 | Bailey et al. | |
| 5,181,201 A | * 1/1993 | Schauss et al. | 370/85.1 |
| 5,182,800 A | 1/1993 | Farrell et al. | |
| 5,195,185 A | 3/1993 | Marenin | |

FOREIGN PATENT DOCUMENTS

| | | |
|---|---|---|
| EP | 0 488 771 A2 | 11/1991 |
| EP | 0 523 627 A2 | 4/1992 |

OTHER PUBLICATIONS

D. Gawlick, "Lock Processing in a Shared Data Base Enviornment", IBM Technical Disclosure Bulletin, vol. 25, No. 10, Mar. 1983, pp. 4980–4985.

H. H. Sotolongo, "Multi–Processor Bus Distributed Arbitration with Centralized Fairness", IBM Technical Disclosure Bulletin, vol. 34, No. 11, Apr. 1992, pp. 200–208.

R.G. Eikill, et al., "Distributed Main Store Bus Arbitration Algorithm and Tie Break Register", IBM Technical Disclosure Bulletin, vol. 33, No. 4, Sep. 1990, pp. 294–296.

"Dual–Ported Bus Structure With Asynchronous DMA Handshake", IBM Technical Disclosure Bulletin, vol. 28, No. 11, Apr. 1986, pp. 4782–4785.

W. Chapman, et al., "Bus Arbitration and Buffer Management", IBM Technical Disclosure Bulletin, vol. 30, No. 11, Apr. 1988, pp. 387–391.

(List continued on next page.)

Primary Examiner—Daniel H. Pan
(74) Attorney, Agent, or Firm—Casimer K. Salys; Bracewell & Patterson, L.L.P.

(57) ABSTRACT

An arbitration protocol is provided for determining between a pair of subsystems within a networking system having a plurality of subsystems which subsystem might obtain access to a common hardware resource. The protocol allows the networking system to determine which subsystem becomes the sender and which becomes the receiver. The protocol is based on a point-to-point communication between two peer subsystems. It is based on an asymmetrical quality such that the first or priority subsystem has a zero latency in accessing the switch while the second subsystem must wait at least one clock cycle before obtaining access to the network system after requesting it and after the end of control by the first subsystem.

9 Claims, 7 Drawing Sheets

OTHER PUBLICATIONS

D.G. Bourke, et al., "Time Division Multiplesed Service Requesting", IBM Technical Disclosure Bulletin, vol. 33, No. 1A, Jun. 1990, pp. 340–346.

D.F. Bantz, "Decentrilized Request Resolution Mechanisms", IBM Technical Disclosure Bulletin, vol. 20, No. 2, Jul. 1977, pp. 853–855.

Donalk M. Chiarulli, et al. "Optical Bus Control for Distributed Multiprocessors", Journal of Parallel and Distributed Computing, 10, 1990, pp. 45–54.

D. Carden, et al., "A Fast Image Bus, Display and Processing Enviornment of the Macintosh II", Departmend of Electrical Engineering, University College, University of NSW, ADFA, Canberra ACT, pp. 197–200.

Thomas Wheatley, "Determining Bus Arbitration Policies and Data Transfer Techniques for Multiprocessor Systems", National Institute of Standards and Technology, Gaithersburg, MD, IEEE, 1991, pp. 143–146.

T. Nakada, et al., "Bus Arbitration Method for A Two–Way Multiprocessor", IBM Technical Disclosure Bulletin, vol. 35, No. 5, Oct. 1992, pp. 439–442.

D. Cocanougher, et al., "Two–Party Bus Arbitration for Floating–Point Operation", IBM Technical Disclosure Bulletin, vol. 29, No. 11, Apr. 1987, pp. 4800–4801.

* cited by examiner

ARBITRATION PROTOCOL FOR PEER-TO-PEER COMMUNICATION IN SYNCHRONOUS SYSTEMS

BACKGROUND OF THE INVENTION

1. Technical Field

The present invention relates, in general to granting bus priority to a requesting subsystem and, in particular, to a protocol for establishing bus priority between competing systems on the same bus. More particularly still, the present invention relates to a zero-cycle arbitration protocol to allow point-to-point communication between two peer subsystems across the same bus line.

2. Description of the Related Art

Bus arbitration protocol and methods for arbitrating bus access are well known in the art. Typically, the arbitration method or protocol is designed so as to reduce the arbitration overhead when one of two subsystems continuously uses the system bus. The arbitration protocol also is used to guarantee fairness so as not to starve one of the subsystems from the bus system. Bus systems having multiple subsystems often use an arbitration mechanism to avoid bus contention.

One example of an arbitration system is one that decides who is sending and who is listening by way of a symmetrical protocol. Typically, three clock cycles are required in the symmetrical protocol where one cycle is used for sending a request, the second cycle is used for the arbitration, and the third cycle is used for the response with the proper selection. A second arbitration protocol uses a master-slave relationship where one system is the master and the other is the slave such that the slave always makes requests for the bus while the master arbitrates whether to grant bus access to the slave. Like the symmetrical protocol, the master slave system requires at least three clock cycles to perform arbitration and grant bus access to any subsystem.

Accordingly, what is needed is an arbitration system and method that reduces arbitration overhead while keeping the bus use fair to all subsystems on the bus system. Additionally, what is needed is a bus arbitration system that grants at least partial real-time bus access during bus request transmission by at least one of the subsystems on the bus system.

SUMMARY OF THE INVENTION

It is therefore one object of the present invention to provide a protocol for granting bus priority to a requesting subsystem.

It is another object of the present invention to provide the protocol for establishing bus priority between competing systems on the same bus.

It is yet another object of the present invention to provide to zero-cycle arbitration protocol to allow point-to-point communication between two peer subsystems across the same bus line.

The foregoing objects are achieved as is now described. According to the present invention, an arbitration protocol is provided for determining between a pair of subsystems within a networking system having a plurality of subsystems which subsystem might obtain access to a common hardware resource. The protocol allows the networking system to determine which subsystem becomes the sender and which becomes the receiver. The protocol is based on a point-to-point communication between two peer subsystems. It is based on an asymmetrical quality such that the first or priority subsystem has a zero latency in accessing the switch while the second subsystem must wait at least one clock cycle before obtaining access to the network system after requesting it and after the end of control by the first subsystem.

In the protocol, a subsystem can only initiate one transaction per cycle, but the subsystem may make consecutive uses of the common bus. Each use is separated by at least one idle cycle. When the bus is idle, the first subsystem transmits a signal requesting bus access If the second subsystem has not indicated in a previous cycle its own intentions to control the bus. The first subsystem will not transmit if the second subsystem has already indicated its intentions to control the bus. The second subsystem must prevent transmitting over the bus if it determines that the first subsystem has initiated a request for the bus system. Likewise, the second subsystem withholds transmitting until the first subsystem has ended its control of the bus system.

A second asymmetrical protocol is also provided, but delays access to the bus for the first subsystem in contrast to the first embodiment that has zero latency when the first subsystem requests access to the bus when it is available. The delayed action protocol is used for systems that are unable to process data simultaneously with requesting access to the bus, which processing is typically provided by a transparent latch needed for use in the zero-cycle arbitration protocol.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
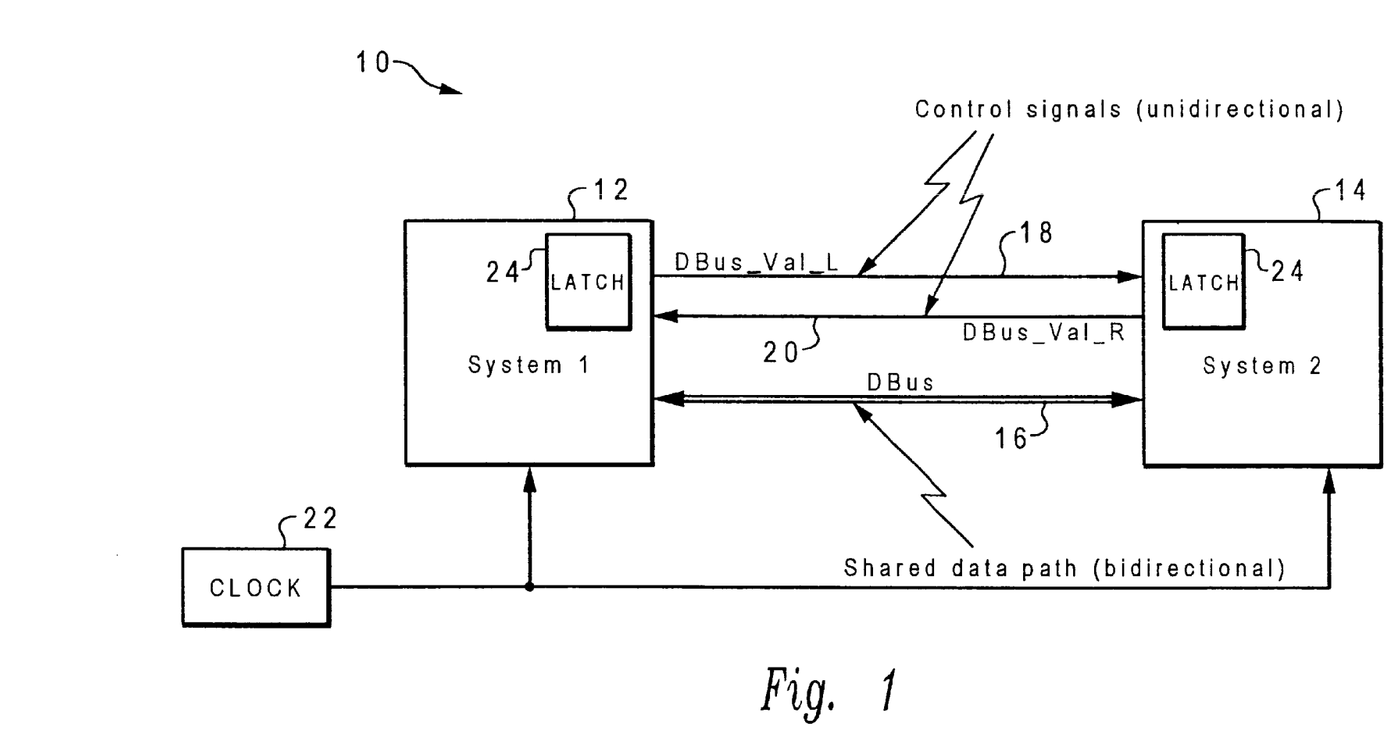
FIG. 1 depicts in accordance with a preferred embodiment of the present invention the access protocol used in a peer-to-peer system.

The access protocol used in a peer-to-peer system 10 illustrated in FIG. 1 above, is a physical level signalling convention used by two modules or systems 12 and 14 to determine which of the two might obtain access to a common hardware resource, such as, for example, a printer peripheral (not shown) or video monitor (not shown), or a third node (not shown) on a networking system. A common bidirectional data bus 16 is used by the protocol to determine which of the modules becomes the sender and which the receiver. The protocol is designed assuming point-to-point communications between peer subsystems that send control signals unidirectionally over control lines 18 and 20.

The protocol is asymmetric, yet fair, meaning that it does not favor one of the sides. This is designed to minimize the number of cycles spent, or latency, in accessing the bus. The asymmetry of the protocol reduces the number of cycles spent in arbitration to zero, thus, this protocol is called zero-cycle arbitration protocol (ZAP).

The protocol requires a centralized clock 22 distributed to communicating subsystems 12 and 14. Thus, the clocks feeding communicating subsystems 12 and 14 are assumed to be phase synchronous, although, perhaps, they may be separated by a well-controlled skew. All transfers of data or control information between communicating subsystems are assumed to take place on a per clock cycle basis. This single cycle is referred to as an interface cycle. Each signal line, defined earlier, transfers at most a single bit of information during an interface cycle.

The protocol is used by subsystems 12 and 14 to gain access to common bidirectional bus 16 and also to indicate the transfer of data over it. Once the access to the bus is established, a subsystem may transfer data for a number of consecutive cycles. Such a contiguous transfer is referred to as a transaction. At the end of a transaction, the subsystem relinquishes control of bus 16, but may try to acquire it again if at a later time it wishes to transmit another transaction. Transmission of valid information during a single clock cycle is referred to as a slice.

The ZAP access protocol relies on the use of transparent latches 24, which are latches that, when enabled, allow the input signals to pass through and be used in subsequent combinational logic before the latch operation is performed. Certain control signals and responses to these signals require the use of a transparent latch. Specifically, certain signals are to be detected and acted upon over two consecutive cycles, starting upon their arrival, where the action may involve inhibition of transmission of some data.

Figure 2:
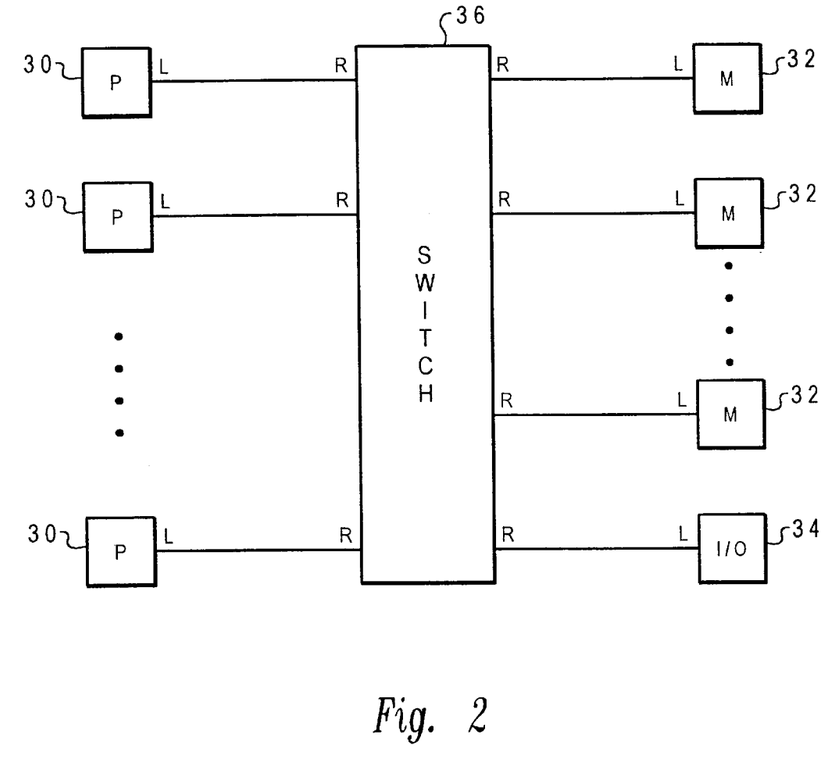
FIG. 2 illustrates the ZAP protocol.

The ZAP protocol is asymmetric and fundamentally has a first side and a second side. This two-sidedness of the ZAP protocol may also be illustrated in FIG. 2 as having a left (small / or large L) and right (small r or large R). For example, a processor 30, memory 32, or I/O module 34 might implement the left side of the protocol, while a central switch 36 implements the right side. Again, this particular assignment is not mandatary since the important aspect is that the two communicating subsystems implement complementary sides of the protocol. This flexibility is particularly important when constructing larger switches, such as multistage interconnection networks out of smaller crossbars. Also, in the case of uniprocessor systems, in which a single processor connects to a single memory module, the processor in memory will implement the complementary protocol sides. The ZAP protocol is defined, in FIG. 1, over signals DBus_Val_L, which represents signals generated by the left subsystem over control line 18, and DBus_Val_R, which represents those signals generated by the right subsystem over control line 20. The protocol also abides by the conventions illustrated in FIG. 3 according to the block diagram therein. The conventions are based upon a cycle that refers to the period of the clock with which the interface is timed. In block 310, a subsystem may initiate at most one transaction per cycle. In block 312, a consecutive uses of the common bus by a subsystem are separated by at least one idle clock cycle. In block 314, when the bus is idle, a left subsystem transmits the first slice of a transaction and the associated x_Val_L signals if the right subsystem has not indicated in the previous cycle its intention to start transmitting. It refrains from transmitting if the subsystem has indicated its intention. In block 316, the right subsystem transmits x_Val_R signals one cycle before it starts transmitting the transaction. The x_Val_R signals are correspondingly negated one cycle before the last slice of the transaction is transmitted. In block 318, the right subsystem holds off transmitting the first slice of a transaction over the bus if it finds the left subsystem initiating a transaction. It does so until the transmission of that transaction is completed. In the meantime, however, it continues to assert the x_Val_R signals to indicate its continued intention of transmitting, thereby reserving the bus for the next transmission. In block 320, if the bus is being used by the right subsystem, the left subsystem asserts its x_Val_L in a manner similar to the right subsystem specified in block 318 to reserve the next use of the bus.

Figure 3:
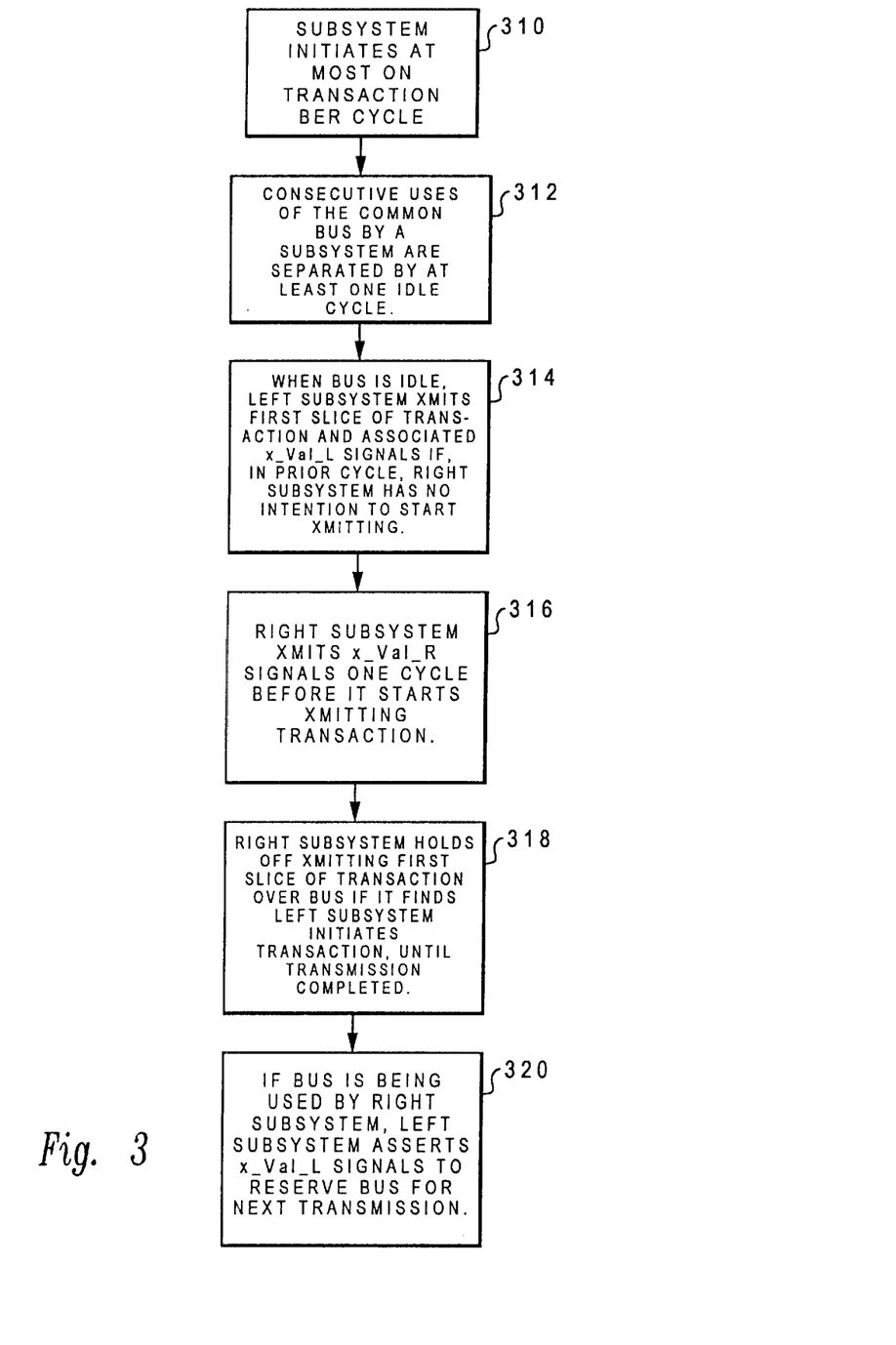
FIG. 3 is a block diagram depicting the conventions of the protocol.
Figure 4:
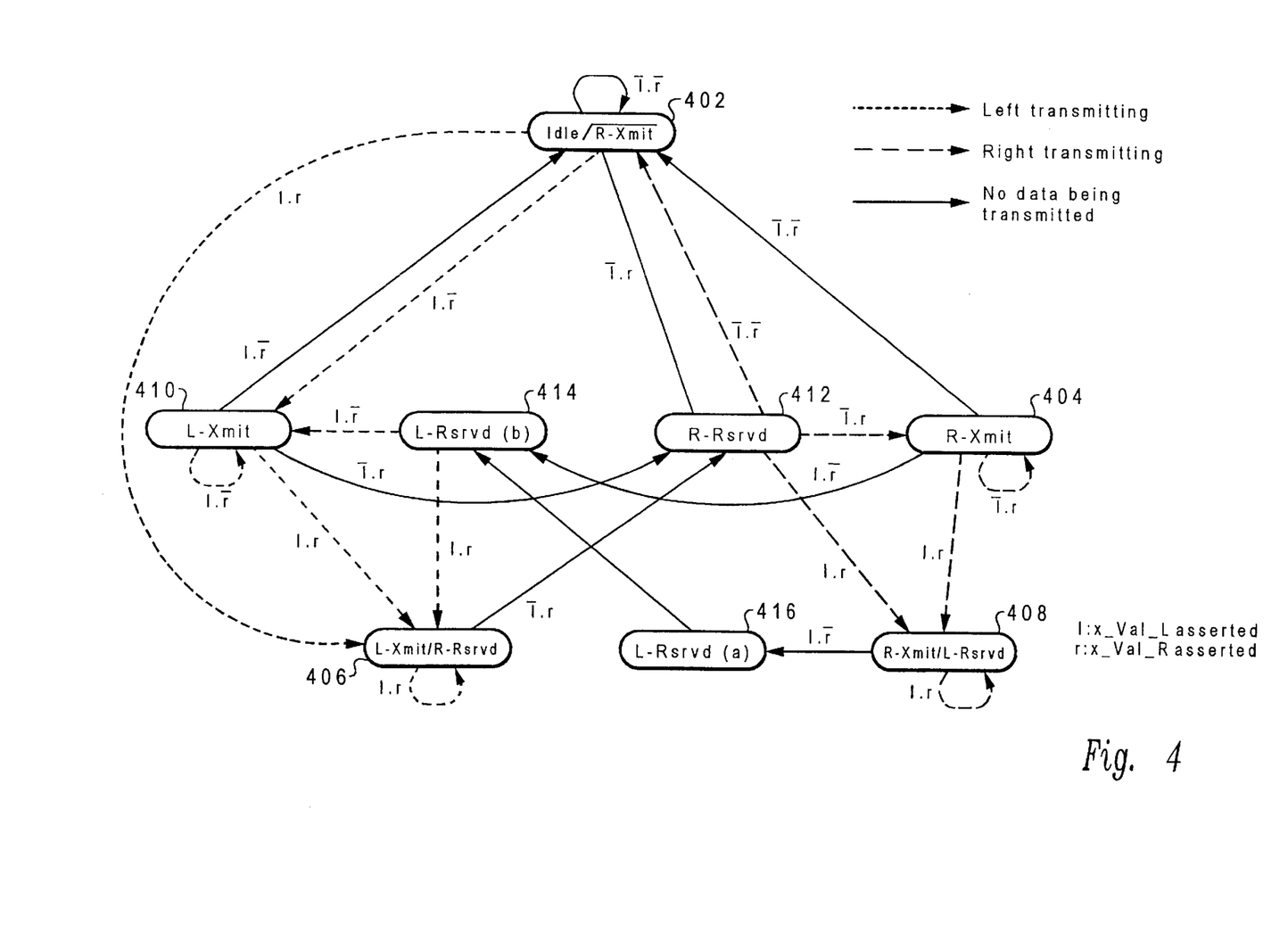
FIG. 4 illustrates a state transition diagram for the shared bus based upon the conventions in FIG. 3.

FIG. 4 illustrates a state transition diagram for the shared bus based upon the conventions in FIG. 3. The bus can be in six possible states. In block 402, the bus is in a left subsystem idle, right subsystem not transmitting state (Idle/$\overline{\text{R-Xmit}}$). During this state, the left subsystem may simply begin to transmit data on the bus without any prior indication. The right subsystem is expected to latch the bus values, but ignore them if the x_Val_L is not asserted. Block 404 illustrates the right subsystem transmitting state or R-Xmit. Block 406 illustrates the left subsystem is transmitting while the right subsystem is reserved, or L-Xmit/R-Reserved state. In this state, the left subsystem is transmitting, but the right subsystem has indicated its desire to transmit next, by asserting the x_Val_R signal and thus reserving the bus for a chance to transmit once the left subsystem has completed its current transmission. In block 408, the state of where the right subsystem is transmitting while the left subsystem is reserved is shown. In this state, the right subsystem is transmitting and the left subsystem has indicated that it wants the bus next. in block 410, the left subsystem transmitting state is shown. In this state, the L-Xmit state is entered after either the left subsystem has transmitted at one slice over a previously idle bus and may continue to do so, or, the right subsystem has just ceased transmitting and the left subsystem wishes to transmit next. One of the last states, block 412, depicts the right subsystem reserved state, or R-Reserved. The R-Reserved state is entered while the bus is idle, the right subsystem asserts its x_Val_R signal. The other last state, block 414, depicts the left subsystem reserved state, or L-Reserved. The L-Reserved state is entered while the bus is idle, the left subsystem asserts its x_VAL_L signal.

The transition diagram in FIG. 4 also shows when the system is at a particular state where the next state will be based upon the asserted signals by either the left or right subsystem. A small / represents that the x_Val_L has been asserted while a small r represents that a x_Val_R signal has been asserted and the complements of the small l and small r are that no signal has been asserted by the left signal or right signal or left subsystem or right subsystem, respectively. For example, in the Idle/$\overline{\text{R-Xmit}}$ state in block 402, if neither the left subsystem or right subsystem have asserted a signal, then the state in block 402 is maintained. If both the left subsystem and right subsystem have asserted a signal, then the transition progresses to the state in block 408. If the right subsystem has been asserted, but the left subsystem has not, then the bus state transitions to block 412, while if the left subsystem has asserted a signal, but the right subsystem has not, then the bus state transitions to block 414.

An alternative protocol to the ZAP protocol, also based on the asymmetric aspect of the ZAP protocol, is a delayed action protocol (DAP). The DAP protocol also allows negotiation of access rights to shared resources, such as busses, without the penalty of an explicit handshake between two peer systems. This aspect does not mandate or imply any particular alignment of x_Val_X, where x=L or R, signals with the transmitted data. In the case of the ZAP protocol, the cycle being negotiated for is the same one during which the signals are exchanged, except when the right subsystem signal is issued one cycle before gaining access. The DAP protocol allows the protocol to negotiate for some cycle later in time. Thus, the ZAP protocol is still used to resolve a conflict of access; however, the access is implied for certain, or predefined, future cycle. Thus, x_Val_X signals retain their current definitions as outlined above to establish the access rights to the bus.

Figure 5:
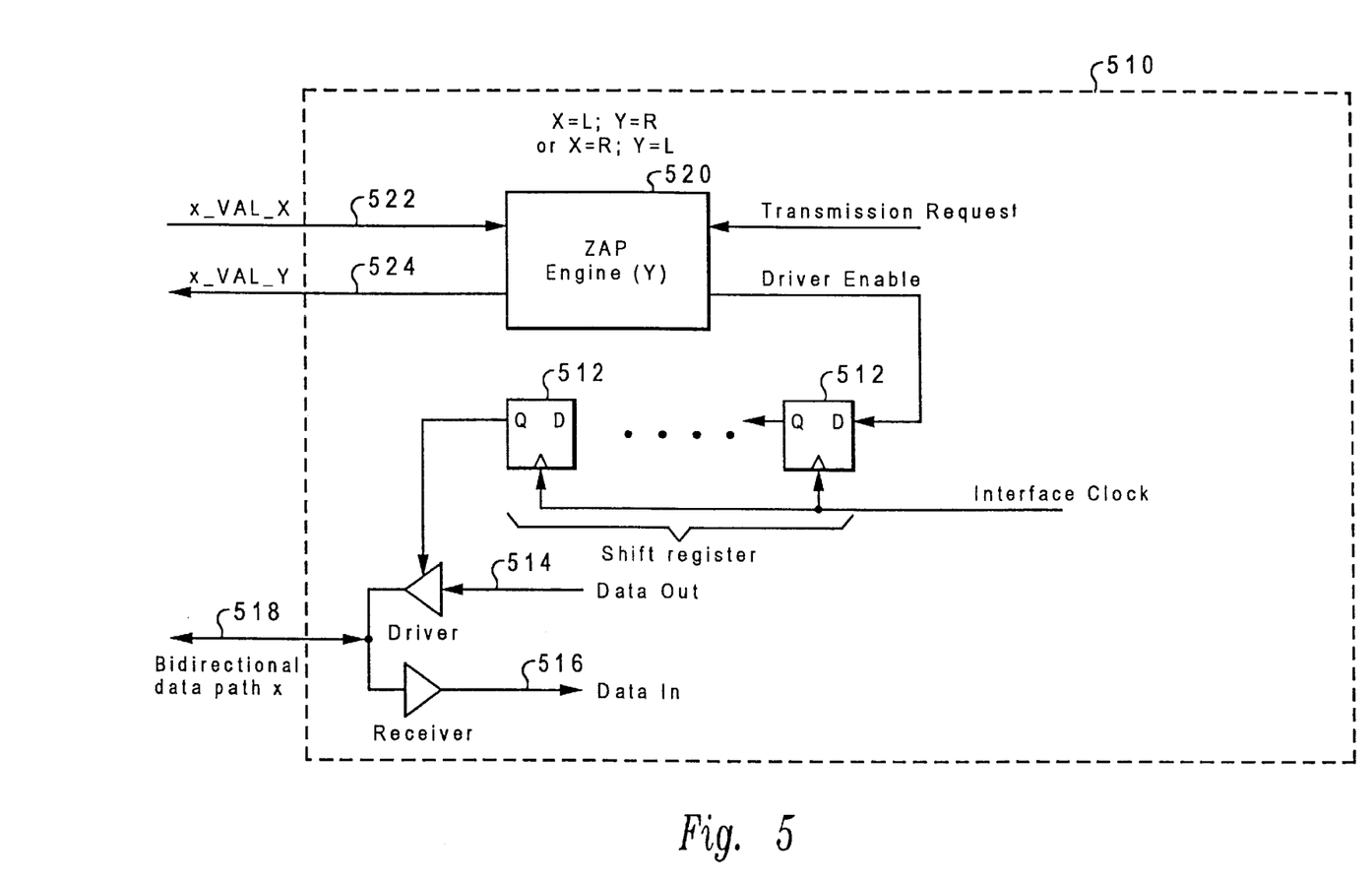
FIG. 5 is a schematic diagram depicting a DAP subsystem according to the present invention.

A DAP subsystem 510 is illustrated in the schematic diagram shown in FIG. 5. The result of this negotiation is stored in shift registers 512 of appropriate length. The shifted out bits of these registers are used later to enable the subsystem via driver 514 and receiver 516 to obtain access rights to drive the bus 516. To facilitate this flexibility, the subsystems can be programmable such that they can be statically configured to delay their access by a predetermined number of cycles, so that the same type of chips can be used to carry both delayed and nondelayed paths. Shift registers 512 are fed from ZAP engine 520, which communicates over unidirectional control signals 522 and 524. An interface clock signal is used to control shift registers 512.

The delayed action protocol permits pipelining of the interface. It also allows setting up of paths through the switch in advance of the actual transfer of data. In situations where such a delay is inherent and unavoidable, the delayed protocol leads to improved performance.

Further, a two or more cycle DAP also does not require a transparent latch, as required in the ZAP protocol. Such latches are necessary to implement the ZAP or a one cycle DAP. Thus, if the presence of transparent latches leads to problems for the testability goals of an implementation technology, then implementing a two-cycle DAP will solve that problem by allowing both the left and right subsystems to arbitrate for a bus a cycle ahead of its actual use. Thus, if the arbitration signals are transmitted in the $i^{th}$ cycle, arbitration is done in the $i+1^{st}$ cycle, and the transmission of data over the bus takes place during the $i+2^{nd}$ cycle.

Figure 6:
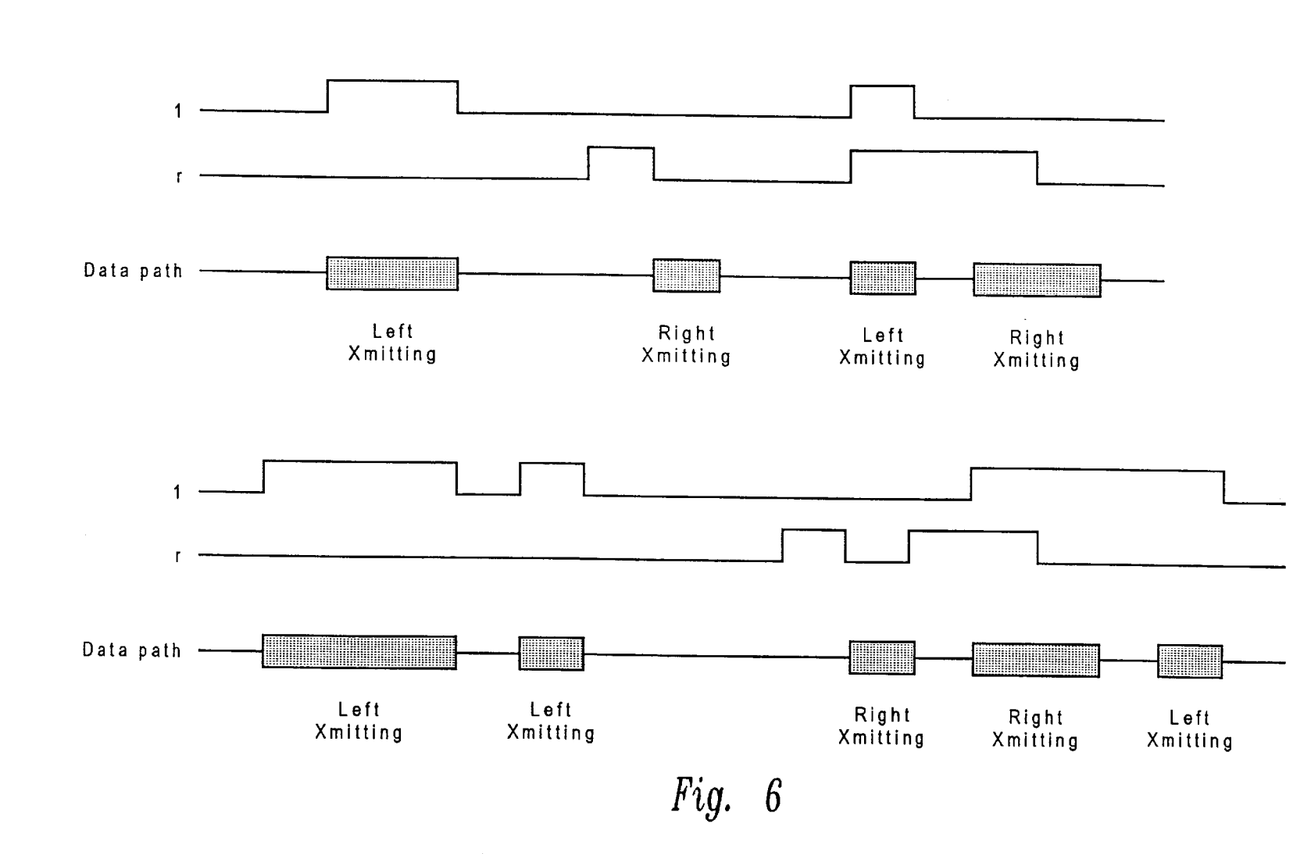
FIG. 6 depicts a timing diagram for a ZAP based system according to the present invention.
Figure 7:
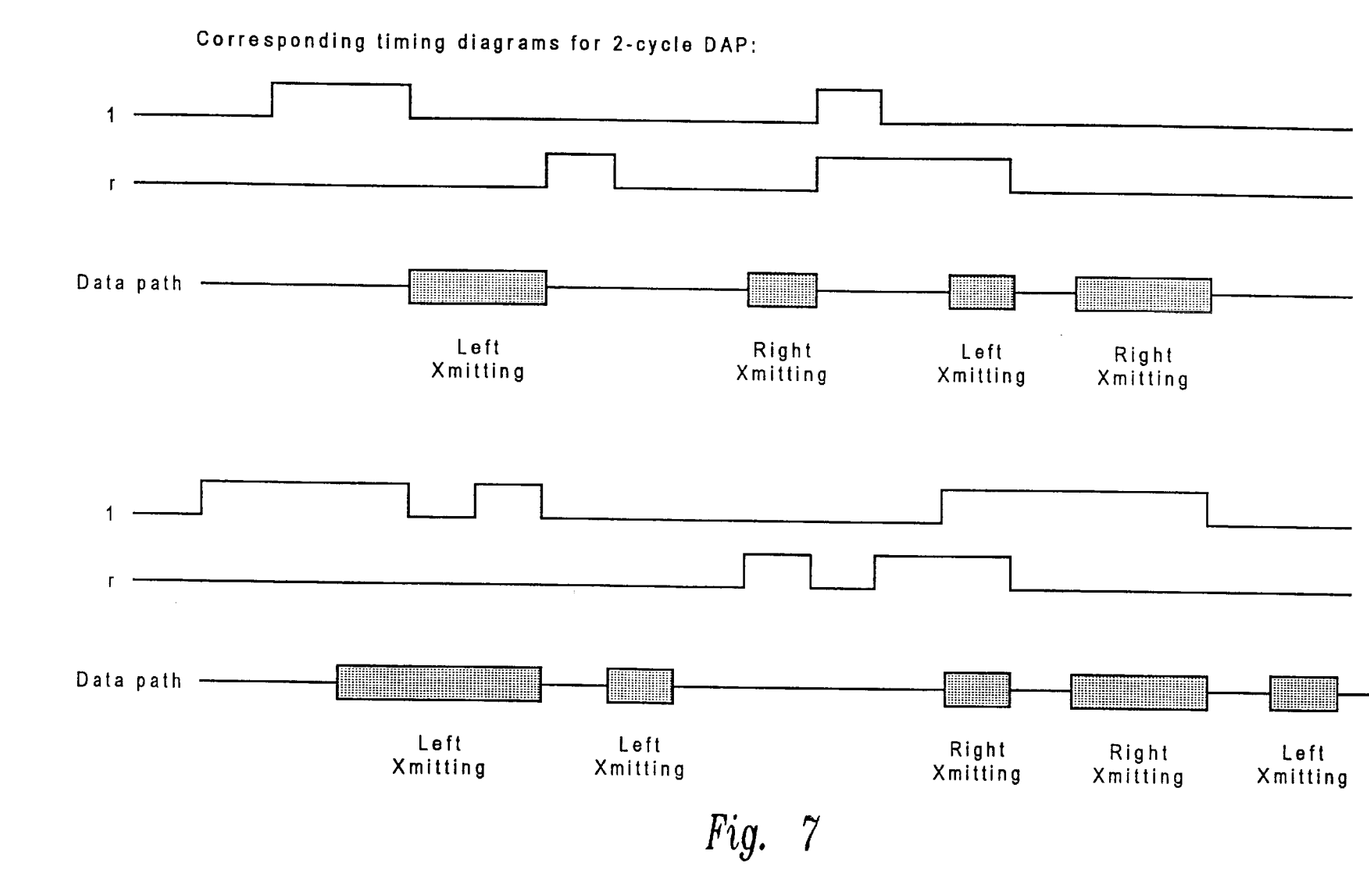
FIG. 7 depicts a timing diagram a two-cycle DAP protocol according to the present invention.

FIGS. 6 and 7 illustrate timing diagrams for a ZAP based system and for a two-cycle DAP system. In FIG. 6, when the ZAP protocol has a left channel request, the left channel begins transmitting immediately. Once the left channel has ended transmission, the right channel requests access to transmit and begins so one cycle later. Once the right channel is through, an example of when both the right and left channels request bus priority is then shown. In this illustration, the left channel gains priority and begins transmitting immediately and upon completion, one cycle passes before the right channel is allowed control of the bus for transmission. The timing diagram further illustrates that while the left channel is transmitting without request from the right channel, the left channel is allowed to transmit synchronously with its request. Anytime the right channel requests bus access, one clock cycle must pass, this is so even if the left channel never requested bus access. Once the left channel does request access, the right channel is allowed to finish transmission and one clock cycle passes before the left channel is allowed to control the bus for transmission.

In the timing diagram of FIG. 7, the two-cycle DAP protocol is illustrated such that whenever the left channel requests bus access for transmitting, one clock cycle must pass before transmission begins. Once transmission ends and the right channel requests control of the bus, two clock cycles before the right channel can begin transmitting over the bus. If both channels simultaneously request access to the bus, the left channel has priority and begins transmitting one clock cycle after requesting access with a second clock cycle separating the ending of the left channel's control of the bus and the beginning of the right channel's control of the bus. Even when the left channel is allowed to transmit uninterrupted by the right channel, once it ends transmission, it must reassert control of the bus and wait one clock cycle before it can begin retransmitting. Likewise, if the right channel is allowed to transmit uninterrupted from the left channel, it must wait two clock cycles before transmitting. This is so even after it has ended transmission and then requests control of the bus again. Also, if the right channel has requested frequently to control the bus before the left channel makes any such request, the right channel is given priority until such a time as the right channel is done transmitting and then the left channel is given control of the bus one clock cycle after the end of the right channel's control has ended.

While the invention has been particularly shown and described with reference to a preferred embodiment, it will be understood by those skilled in the art that various changes in form and detail may be made therein without departing from the spirit and scope of the invention.

What is claimed is:

1. In a synchronous communication system having a plurality of subsystems coupled to a system bus, a protocol for arbitrating control of said bus between a first subsystem and a second subsystem, said protocol comprising:

allowing said first subsystem to control said bus substantially upon request using a transparent latch within said first subsystem if there is no activity on said bus by allowing said first subsystem to transmit said reguest and data substantially simultaneously, said request being transmitted during said transmission of said data;

granting access to said bus to said second subsystem using a transparent latch within said second subsystem at least one cycle after requesting access to said bus;

granting bus access to said second subsystem upon the completion of data transmission by said first said subsystem one cycle thereafter; and granting bus access to said first subsystem one cycle after said second subsystem ends transmission after said first subsystem requests access to said bus.

2. The invention according to claim 1 wherein said first subsystem obtains control of said bus upon a next clock cycle if there is no activity on said bus.

3. The invention according to claim 1 further comprising:

determining whether said first subsystem controls said bus; and preventing said second subsystem to transmit data over said bus until after said first subsystem ends transmission over said bus.

4. In a synchronous communication subsystem having a plurality of subsystems coupled to a system bus, a protocol for arbitrating control over said bus between a first subsystem and a second subsystem, said protocol comprising:

allowing a first subsystem to gain control of said bus and allow data transmission over said bus upon request using a transparent latch within said first subsystem if there is no activity on said bus by allowing said first subsystem to transmit said request and data substantially simultaneously, said request being transmitted during said transmission of said data;

granting access to said bus to said second subsystem using a transparent latch within said second subsystem upon a next clock cycle after requesting access to said bus if there is no activity on said bus;

granting bus access to said second subsystem upon the completion of data transmission by said first subsystem at the beginning of the next cycle after said second subsystem ends transmission.

5. The invention according to claim 4 further comprising:

granting priority access to said bus system to said first subsystem if said first and second subsystems request access to said bus simultaneously.

6. The invention according to claim 5 wherein said second subsystem obtains access to said bus after requesting access to said bus one cycle after the completion of data transmission by said first subsystem.

7. A synchronous communication system comprising a plurality of subsystems coupled to a system bus, each subsystem further comprising a unidirectional control line coupled to the rest of said plurality of subsystems whereby asymmetrical control of said bus is arbitrated between a first subsystem and a second subsystem based upon control signals communicated one to another over said control lines and through a transparent latch within each of said first and second subsystems, each transparent latch being coupled to said control lines, and said first subsystem transmitting a request and data substantially simultaneously, said request being transmitted during said transmission of said data.

8. The invention according to claim 7 further comprising a central switch coupled to said system bus and further coupled to each control line from said plurality of subsystems wherein one of said plurality of subsystems serves as a first subsystem and said central switch serves as a second subsystem.

9. The invention according to claim 7 further comprising a clock coupled to each of said plurality of subsystems for providing synchronization between said subsystems.

* * * * *